US012623823B1

(12) United States Patent
    Goetsch

(10) Patent No.: US 12,623,823 B1
(45) Date of Patent: May 12, 2026

(54) RECYCLABLE PACKAGING MATERIALS

(71) Applicant: Printpack Illinois, Inc., Elgin, IL (US)

(72) Inventor: Wil Ryan Goetsch, Maple Grove, MN (US)

(73) Assignee: Printpack Illinois, Inc., Elgin, IL (US)

( * ) Notice: Subject to any disclaimer, the term of this patent is extended or adjusted under 35 U.S.C. 154(b) by 638 days.

(21) Appl. No.: 18/102,840

(22) Filed: Jan. 30, 2023

Related U.S. Application Data

(62) Division of application No. 16/738,266, filed on Jan. 9, 2020, now Pat. No. 11,584,574.

(60) Provisional application No. 62/802,421, filed on Feb. 7, 2019, provisional application No. 62/790,651, filed on Jan. 10, 2019.

(51) Int. Cl.
    | | |
    |---|---|
    | *B65D 65/40* | (2006.01) |
    | *B32B 7/14* | (2006.01) |
    | *B32B 15/082* | (2006.01) |
    | *B32B 15/095* | (2006.01) |
    | *B32B 27/08* | (2006.01) |
    | *B32B 37/02* | (2006.01) |
    | *B32B 37/12* | (2006.01) |
    | *B32B 43/00* | (2006.01) |

(52) U.S. Cl.
    CPC ............... *B65D 65/40* (2013.01); *B32B 7/14* (2013.01); *B32B 15/082* (2013.01); *B32B 15/095* (2013.01); *B32B 27/08* (2013.01); *B32B 37/02* (2013.01); *B32B 37/1292* (2013.01); *B32B 43/00* (2013.01); *B32B 2323/043* (2013.01); *B32B 2439/00* (2013.01)

(58) Field of Classification Search
    None
    See application file for complete search history.

(56) References Cited

U.S. PATENT DOCUMENTS

| | | |
|---|---|---|
| 4,276,330 A | 6/1981 | Stanley et al. |
| 5,466,734 A | 11/1995 | Catena et al. |
| 5,798,174 A | 8/1998 | Wilkie |
| 5,891,555 A | 4/1999 | O'Brien |
| 5,981,047 A | 11/1999 | Wilkie |
| 6,287,658 B1 | 9/2001 | Cosentino et al. |
| 6,413,333 B1 | 7/2002 | Bader et al. |

(Continued)

FOREIGN PATENT DOCUMENTS

| | | |
|---|---|---|
| CN | 114347608 A | 4/2022 |
| CN | 115782338 A | 3/2023 |

(Continued)

*Primary Examiner* — Barbara J Musser
(74) *Attorney, Agent, or Firm* — Additon, Pendleton & Witherspoon P.A.

(57) ABSTRACT

Layers of a recyclable packaging material can include a first layer of, or including, oriented polyethylene; a second layer of, or including, oriented polyethylene; a tie layer disposed between and joining the first layer and the second layer to one another; an ink layer printed onto at least a portion of at least one of an inner surface of the first layer or an outer surface of the first layer; a metallic barrier layer on at least a portion of at least one of the first and second layers; and an adhesive layer on at least a portion of an outer surface of the second layer and at least partially defining an exterior surface of the recyclable packaging material. A cold seal release coating can be on at least a portion of at least one of the ink layer or the outer surface of the first layer.

20 Claims, 7 Drawing Sheets

(56) References Cited

U.S. PATENT DOCUMENTS

| | | | |
|---|---|---|---|
| 6,773,818 B2 | 8/2004 | Cretekos et al. | |
| 7,279,205 B2 | 10/2007 | Huffer et al. | |
| 8,227,062 B2 | 7/2012 | Nowak et al. | |
| 9,365,003 B1 | 6/2016 | Montsinger et al. | |
| 9,676,169 B2 * | 6/2017 | Paulino | B32B 27/18 |
| 11,376,830 B2 | 7/2022 | Wang et al. | |
| 11,384,262 B2 | 7/2022 | Stufflebeam | |
| 11,407,160 B2 | 8/2022 | Borse et al. | |
| 11,479,025 B2 | 10/2022 | Lindemann et al. | |
| 11,584,574 B1 | 2/2023 | Goetsch | |
| 11,691,398 B2 | 7/2023 | Pey | |
| 11,712,878 B2 | 8/2023 | Ambroise et al. | |
| 2002/0106465 A1 | 8/2002 | Huffer et al. | |
| 2004/0053066 A1 | 3/2004 | Cretekos et al. | |
| 2005/0003155 A1 | 1/2005 | Huffer | |
| 2005/0106317 A1 | 5/2005 | Shino | |
| 2008/0032141 A1 | 2/2008 | Longmoore | |
| 2009/0197022 A1 | 8/2009 | Lu et al. | |
| 2010/0035057 A1 | 2/2010 | Ishida | |
| 2010/0209640 A1 | 8/2010 | Yun | |
| 2011/0152052 A1 | 6/2011 | Schumacher et al. | |
| 2012/0152785 A1 | 6/2012 | Benson et al. | |
| 2013/0121624 A1 | 5/2013 | Lyzenga et al. | |
| 2013/0129992 A1 | 5/2013 | Jahromi et al. | |
| 2015/0117797 A1 | 4/2015 | Cigallio et al. | |
| 2016/0229157 A1 | 8/2016 | Clare | |
| 2016/0319074 A1 | 11/2016 | Boccon et al. | |
| 2016/0339663 A1 | 11/2016 | Clare | |
| 2018/0339498 A1 | 11/2018 | Zborowski et al. | |
| 2018/0370202 A1 | 12/2018 | Niedersuss et al. | |
| 2019/0092914 A1 | 3/2019 | Leger et al. | |
| 2019/0299580 A1 | 10/2019 | Dou et al. | |
| 2020/0248038 A1 | 8/2020 | Stufflebeam | |
| 2020/0254737 A1 | 8/2020 | Gillespie et al. | |
| 2020/0324513 A1 | 10/2020 | Tian et al. | |
| 2020/0346440 A1 | 11/2020 | Pey | |
| 2020/0369014 A1 | 11/2020 | Ambroise | |
| 2021/0252842 A1 | 8/2021 | Gohr et al. | |
| 2021/0316539 A1 | 10/2021 | Wang et al. | |
| 2022/0250363 A1 | 8/2022 | Lee et al. | |
| 2022/0402192 A1 | 12/2022 | Aubee et al. | |
| 2023/0026039 A1 | 1/2023 | Ruocco et al. | |
| 2023/0027410 A1 | 1/2023 | Chen et al. | |
| 2023/0088010 A1 | 3/2023 | Francklow et al. | |
| 2023/0092207 A1 | 3/2023 | de Vargas et al. | |
| 2023/0118316 A1 | 4/2023 | Wang et al. | |
| 2023/0234347 A1 | 7/2023 | Huffer et al. | |
| 2023/0241871 A1 | 8/2023 | Wang et al. | |
| 2023/0407065 A1 | 12/2023 | Biswas et al. | |
| 2024/0092066 A1 | 3/2024 | Zalamea Bustillo | |

FOREIGN PATENT DOCUMENTS

| | | |
|---|---|---|
| CN | 113997665 B | 9/2023 |
| CN | 118255058 A | 6/2024 |
| CN | 221519016 U | 8/2024 |
| DE | 19610263 A1 | 9/1997 |
| EP | 3526030 B1 | 9/2017 |
| EP | 4122697 A1 | 1/2023 |
| EP | 3630449 B1 | 10/2024 |
| WO | 2017/102704 A1 | 6/2017 |
| WO | 2018/034735 A1 | 2/2018 |
| WO | 2018/226514 A1 | 12/2018 |
| WO | 2019/059958 A1 | 3/2019 |
| WO | 2019/067005 A1 | 4/2019 |
| WO | 2019/132954 A1 | 7/2019 |
| WO | 2019/156733 A1 | 8/2019 |
| WO | 2020/257411 A1 | 12/2020 |
| WO | 2021/118739 A1 | 6/2021 |
| WO | 2023/092393 A1 | 6/2023 |
| WO | 2023/198578 A1 | 10/2023 |
| WO | 2023/249633 A1 | 12/2023 |
| WO | 2024/046819 A1 | 3/2024 |
| WO | 2024/050669 A1 | 3/2024 |
| WO | 2024/068314 A1 | 4/2024 |
| WO | 2024/158392 A1 | 8/2024 |

* cited by examiner

RECYCLABLE PACKAGING MATERIALS

CROSS-REFERENCE TO PRIORITY APPLICATIONS

This is a divisional application of U.S. application Ser. No. 16/738,266, filed Jan. 9, 2020, now U.S. Pat. No. 11,584,574, which claims the benefit of U.S. Provisional Application Nos. 62/790,651 (filed Jan. 10, 2019) and 62/802,421 (filed Feb. 7, 2019).

INCORPORATION BY REFERENCE

The entire disclosure of each of U.S. application Ser. No. 16/738,266, filed Jan. 9, 2020, and U.S. Provisional Application Nos. 62/790,651 (filed Jan. 10, 2019) and 62/802,421 (filed Feb. 7, 2019) is incorporated herein by reference in its entirety.

BACKGROUND

Packaging materials, for example, used to form packages for food or other items, are typically formed from polyester/polypropylene film composites. However, since the component materials have different melting points and processing characteristics, packaging materials formed from polyester/polypropylene film composites are difficult to recycle.

Attempts have been made to form recyclable packaging materials from various polyethylenes. Unfortunately, many linear low density polyethylenes (LLDPE) and low density polyethylenes (LDPE) lack the stiffness and/or heat resistance needed to be formed into packages. High density polyethylenes (HDPE) offer somewhat greater stiffness and heat resistance, but lack the optical clarity to be used in such packages.

Thus, there remains a need for packaging materials for a variety of applications that can be recycled.

SUMMARY

The present disclosure is directed generally to various packaging materials. The packaging materials include at least one layer of oriented polyethylene (OPE), for example, high density polyethylene (HDPE). The OPE (e.g., oriented HDPE) may be oriented in one direction (e.g., machine direction/MDO or MDOPE) or in both directions (e.g., biaxially-oriented/BO or BOPE). Orienting the HDPE film enhances the optical clarity, stiffness, and heat resistance of the film to render it suitable for use in packaging applications. The at least one layer of OPE may be joined to other polyethylene-based layers. For example, at least two layers of OPE may be joined together, and they may support one or more additional layers. The various packaging materials described herein (and variations contemplated hereby) thus have the needed attributes for packaging materials, while also being recyclable.

For example, an aspect of this disclosure is the provision of a recyclable packaging material having a plurality of layers respectively in a facing relationship with one another, wherein the plurality of layers can include a first layer comprising oriented polyethylene; a second layer comprising oriented polyethylene; a tie layer disposed between and joining the first layer and the second layer to one another; an ink layer printed onto at least a portion of at least one of an inner surface of the first layer or an outer surface of the first layer; a metallic barrier layer on at least a portion of at least one of the first and second layers; and an adhesive layer on at least a portion of an outer surface of the second layer and at least partially defining an exterior surface of the recyclable packaging material. A cold seal release coating can be on at least a portion of at least one of the ink layer or the outer surface of the first layer. At least one of the oriented polyethylene of the first layer and the oriented polyethylene of the second layer can be oriented high density polyethylene.

Another aspect of this disclosure is the provision of a recyclable packaging material having a plurality of layers respectively in a facing relationship with one another, wherein the plurality of layers can include a first layer comprising oriented high density polyethylene; a second layer comprising oriented high density polyethylene; a tie layer disposed between and joining the first layer and the second layer to one another; an ink layer printed onto at least a portion of at least one of an inner surface of the first layer or an outer surface of the first layer; a metallic barrier layer on at least a portion of the second layer; a cold seal adhesive layer on at least a portion of an outer surface of the second layer and at least partially defining a first exterior surface of the recyclable packaging material; and a cold seal release layer on at least a portion of at least one of the ink layer or an outer surface of the first layer, wherein the cold seal release layer at least partially defines a second exterior surface of the recyclable packaging material that is opposite from the first exterior surface of the recyclable packaging material.

A further aspect of this disclosure is the provisional of a method of at least partially forming a recyclable packaging material having a layer of oriented polyethylene, wherein the method can include printing an ink layer onto at least a portion of at least one of an inner surface of a first layer comprising oriented polyethylene or an outer surface of the first layer comprising oriented polyethylene; laminating the first layer to a second layer comprising oriented polyethylene; applying a patterned adhesive layer on at least a portion of an outer surface of the second layer, so that the patterned adhesive layer partially defines an exterior surface of the recyclable packaging material; and then forming the recyclable packaging material into a roll. The method can comprise drawing the first layer through a system so that the first layer's first side is in opposing face-to-face relation with a predetermined component of the system, including providing the first layer in a first orientation to the system, wherein the printing occurs during the drawing; drawing the first layer through the system with the first layer's second side in opposing face-to-face relation with the predetermined component, including providing the first layer in a second orientation to the system, and the first and second orientations being inverted from one another; during the providing of the first layer in a second orientation to the system, applying material onto at least a portion of at least one of the ink layer or an outer surface of the first layer; and in the roll of the recyclable packaging material the patterned adhesive layer can be in opposing face-to-face contact with the material.

The foregoing summary provides a few brief examples and is not exhaustive, and the present invention is not limited to the foregoing examples. Various other features, aspects, and advantages of the present invention will be evident from the following description and accompanying figures.

BRIEF DESCRIPTION OF THE DRAWINGS

The drawings discussed below are schematic, and features depicted therein may not be drawn to scale. The drawings are provided as examples. The present invention may be embodied in many different forms and should not be construed as limited to the examples depicted in the drawings.

DETAILED DESCRIPTION

Examples of embodiments are disclosed in the following. The present invention may, however, be embodied in many different forms and should not be construed as limited to the embodiments set forth herein. For example, features disclosed as part of one embodiment or example can be used in the context of another embodiment or example to yield a further embodiment or example. As another example of the breadth of this disclosure, it is within the scope of this disclosure for one or more of the terms "substantially," "about," "approximately," and/or the like, to qualify each of the adjectives and adverbs of the Detailed Description section of this disclosure, as discussed in greater detail below.

Figure 1A:
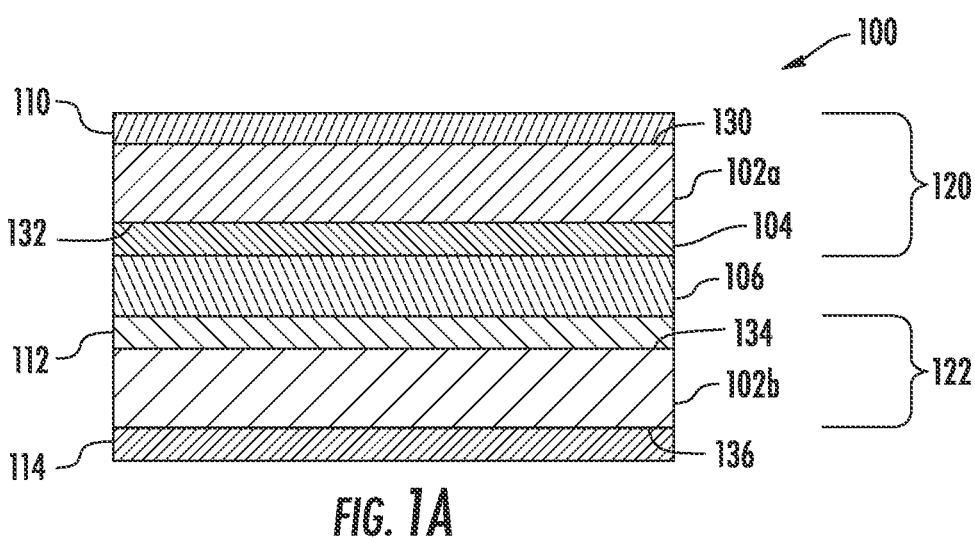
FIG. 1A is a cross-sectional view of a web of composite material that may be used as packaging material, wherein the cross-section is taken perpendicular to the length of a flat piece of the packaging material, and the packaging material includes a first or outer composite layer or web (e.g., printed web) and a second composite layer or web (e.g., barrier web) that are joined to one another, in accordance with an embodiment of this disclosure.

FIG. 1A schematically depicts an exemplary recyclable material/composite material/composite structure 100. The material 100 may be suitable for use as a recyclable packaging material, for example, for food items. As shown in FIG. 1A, the material 100 may generally include a plurality of layers in a superposed, facing, contacting relationship with one another. The layers may be continuous or discontinuous, as will be understood in the art, and as will be described further below.

More particularly, in the example depicted in FIG. 1A, the material 100 includes a first layer of oriented polyethylene (OPE) 102a, printed ink layer(s) 104 (optional, but may typically be present when the material is used to form a package), a tie layer 106, and a second layer of OPE 102b. The material 100 may also include one or more optional layers 110, 112, 114, as will be described further below.

The first and second OPE layers 102a, 102b may each independently have a thickness of from about 60 to about 120 gauge, for example, from about 80 to about 110 gauge, for example, about 100 gauge. The OPE layers 102a, 102b may be, for example, high density polyethylene (HDPE) oriented in one direction (e.g., machine direction/MDO, MDOPE, or MDHDPE) or in both directions or other suitable crosswise directions (e.g., biaxially-oriented/BO, BOPE, or BOHDPE). The orienting of the PE layers 102a, 102b enhances (increases) their optical clarity, stiffness, and heat resistance. One or both of the OPE layers 102a, 102b may be transparent, translucent or any combination thereof. The OPE layers 102a, 102b may be extruded or coextruded, as will be described further below.

The tie layer 106 may comprise an adhesive layer (i.e., adhesive/adhesive lamination) or an extruded polymer layer (i.e., extrudate/extrusion lamination). Adhesive lamination may generally be selected for packaging/wrapping smaller items, and/or for applications requiring less puncture resistance. Examples of such applications may include, but are not limited to, packages/wrappers for snack bars, candy bars, protein/nutraceutical bars, cookies, crackers, wafers, soft baked goods, brownies, snack cakes, and so on. Extrusion lamination may generally be selected for packaging more dense items (e.g., large packages including smaller, dense items) and/or for applications needing additional thickness and puncture resistance. Examples of such applications may include, but are not limited to, packages/wrappers for chips, snack mixes, nuts, salty snack items, and so on.

For the tie layer 106, any suitable adhesive may be used, for example, an acrylic polyurethane adhesive. The adhesive may be applied in an amount of from about 1 to about 1.5 lb/ream, for example, about 1.25 lb/ream. Likewise, any suitable extrudate may be used for the tie layer 106, for example, polyethylene, LDPE, or LLDPE. The extrudate layer may have a basis weight of from about 4 to about 14 lb/ream, for example, about 8 lb/ream.

Where tie layer 106 is an adhesive (i.e., where adhesive lamination is used), the resulting material 100 may generally have a yield of from about 12,000 to about 24,000, for example, about 14,570 in$^2$/lb (as measured using ASTM D4321), a basis weight of from about 18 to about 36, for example, about 29.65 lb/ream (as measured using ASTM D646), a thickness of from about 1.3 to about 2.5 mil, for example, about 2.1 mil (as measured using ASTM F2251), a water vapor transmission rate of from about 0.02 to about 1, for example, about 0.20 g/100 in$^2$/24 hrs@100° F./90% RH (as measured using ASTM F1249), and a coefficient of friction of from about 0.2 to about 0.4, for example, about 0.3 (inside/static, inside/kinetic, outside/static, outside/kinetic) (as measured using ASTM 1894).

Where tie layer 106 is an extrudate (i.e., where extrusion lamination is used), the resulting material 100 may generally have a yield of from about 9,000 to about 18,000, for example, about 11,868 in²/lb (as measured using ASTM D4321), a basis weight of from about 23 to about 48 lb/ream, for example, about 36.40 lb/ream (as measured using ASTM D646), a thickness of from about 1.6 to about 3.4 mil, for example, about 2.56 mil (as measured using ASTM F2251), a water vapor transmission rate of from about 0.02 to about 1, for example, about 0.18 g/100 in²/24 hrs@100° F./90% RH (as measured using ASTM F1249), and a coefficient of friction of from about 0.2 to about 0.4, for example, about 0.3 (inside/static, inside/kinetic, outside/static, outside/kinetic) (as measured using ASTM 1894).

With continued reference to FIG. 1A, in some exemplary embodiments (e.g., recyclable cold seal films), the material 100 may include layers 110, 114, where layer 110 may be a cold seal release coating (i.e., an anti-blocking coating), and layer 114 may be a cold seal adhesive layer (e.g., cold-sealing coating). The cold seal release material, coating, or layer 110 (e.g., cold seal release lacquer) may typically be applied as a flood coat having a coat weight of from about 0.1 to about 2 lb/ream. Alternatively, one or more cold seal release materials 110 may be formed in pattern(s).

The at least one cold seal release coating or layer 110 may be transparent, translucent, or any combination thereof. The at least one cold seal release coating or layer 110 may be glossy, matte, or any combination thereof. A glossy cold seal release coating or layer 110 is typically optically transparent, or at least more optically transparent than a matte cold seal release coating or layer 110. A glossy cold seal release coating or layer 110 typically reflects light less diffusely than a matte cold seal release coating or layer 110. A glossy cold seal release coating or layer 110 typically has a shinier visual appearance than a matte cold seal release coating or layer 110.

The cold seal adhesive layer 114 may typically be applied in discrete areas or regions of the packaging material (e.g., in a pattern), and may have a coat weight of from about 2 to about 4.5 lb/ream, for example, about 3.5 lb/ream. The tie layer 106 may be an adhesive layer (i.e., adhesive/adhesive lamination) or an extruded polymer layer (i.e., extrudate/extrusion lamination), as described above.

Optionally, the material 100 may further include layer 112, where layer 112 may comprise a barrier layer (i.e., on the surface of OPE layer 102*b*). The barrier layer 112 may comprise, for example, a metallic material, aluminum, aluminum oxide, and/or any other suitable barrier material. The barrier layer 112 may have a thickness of from about 1 to about 100 nm, for example, from about 10 to 40 nm.

With further reference to FIG. 1A, in other exemplary embodiments (e.g., recyclable heat seal films), the cold seal release coating 110 may optionally be omitted from the material 100 or be more generally referred to as, or be in the form of, an overcoat or overprint varnish, lacquer, or the like; and the layer 114 may be a patterned or continuous heat seal adhesive layer. The heat seal adhesive layer 114 may typically be applied in discrete areas or regions of the packaging material, and may have a coat weight of from about 2 to about 4.5 lb/ream, for example, about 3.5 lb/ream. For the heat seal adhesive layer 114, any suitable heat seal adhesive may be used, for example, a thermoplastic adhesive, polyethylene, LDPE, and/or LLDPE.

Respective layers of the material 100 depicted in FIG. 1A may define first and second composite layers or webs 120, 122 that are initially formed separately from one another and then joined together by the tie layer 106, as will be described further below. As will also be described further below, the first composite layer or web 120 (e.g., printed web) may include one or more of the first OPE layer 102*a*, printed ink layer(s) 104, and cold seal release coating 110; and the second composite layer or web 122 (e.g., barrier web) may include one or more of the second OPE layer 102*b* and barrier layer 112.

FIG. 1A can be described as depicting that the first OPE layer 102*a* includes opposite first and second surfaces or sides 130, 132, wherein the cold seal release coating 110 and printed ink layer(s) 104 are respectively joined directly to (i.e., in opposing face-to-face contact with) the first OPE layer's first and second sides 130, 132. In the context of the fully formed material 100 depicted in FIG. 1A and in relation to the central tie layer 106, the first OPE layer's first side or surface 130 may be referred to as an outer surface, and the first OPE layer's second side or surface 132 may be referred to as an inner surface.

FIG. 1A can be described as depicting that the second OPE layer 102*b* includes opposite first and second surfaces or sides 134, 136, wherein the barrier layer 112 and adhesive layer 114 are respectively joined directly to (i.e., in opposing face-to-face contact with) the second OPE layer's first and second sides 134, 136. In the context of the fully formed material 100 depicted in FIG. 1A and in relation to the central tie layer 106, the second OPE layer's first side or surface 134 may be referred to as an inner surface, and the second OPE layer's second side or surface 136 may be referred to as an outer surface.

As will be discussed in detail further below, one or more of the OPE layers' sides or surfaces 130, 132, 134, 136 may have been altered (e.g., corona treated or plasma treated) to improve adhesion of one or more of the associated layers 104, 110, 112, 114 to the altered surface. In this regard, FIG. 1A can be described as depicting each of the OPE layers 102*a*, 102*b* in the form of a single extruded film, with the horizontal lines identified by reference numerals 130, 132, 134, 136 schematically representing the opposite surfaces of the OPE extruded films 102*a*, 102*b*.

In alternative embodiments or variations of this disclosure, one or more layers may be positioned between layers that have been described as being in direct contact. For example, one or both of the OPE layers 102*a*, 102*b* can be the core layer of a coextruded film that further includes one or more skin layers that are typically thinner than the core layer. In this regard, FIG. 1A can be described as schematically depicting each of the OPE layers 102*a*, 102*b* as the core of a coextruded film, with the horizontal lines identified by reference numerals 130, 132, 134, 136 schematically representing the skin layers of the coextruded films. For example, a first layer of the material 100 may be in the form of a coextruded film including the first OPE layer 102*a* and skin layers 130, 132; and a second layer of the material 100 may be in the form of a coextruded film including the second OPE layer 102*b* and skin layers 134, 136.

Each skin layer 130, 132, 134, 136 may be formed of a material to which the respective layer 104, 110, 112, 114 suitably adheres. For example, each skin layer 130, 132, 134, 136 may be an extrusion of one or more of (e.g., a blend of) polyolefin materials (e.g., polypropylene and/or polyethylene) that has a suitable surface energy. A suitable surface energy is believed to be at least about 36 dynes/cm, or a surface energy of at least 36 dynes/cm. One or more of the skin layers 130, 132, 134, 136 may be omitted.

Figure 1B:
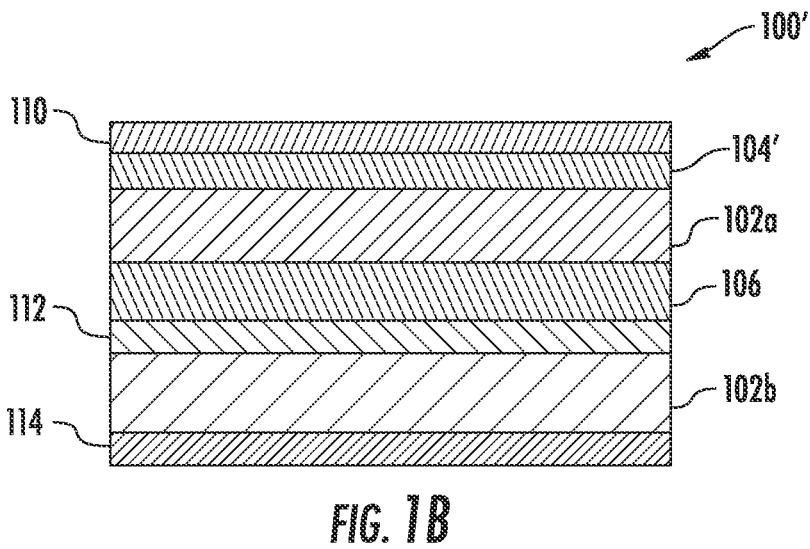
FIG. 1B is like FIG. 1A, except that a printed ink layer has been relocated within the printed web, in accordance with an embodiment of this disclosure.
Figure 1C:
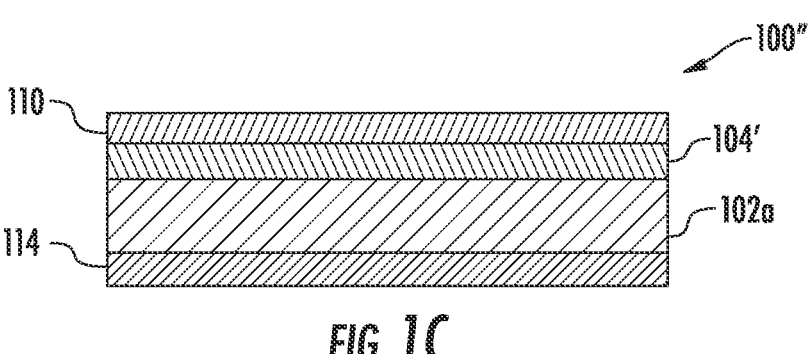
FIG. 1C is like FIG. 1B, except that predetermined layers have been omitted, in accordance with an embodiment of this disclosure.

FIGS. 1B and 1C schematically depict exemplary variations of the material 100 of FIG. 1A. In FIG. 1B, the material 100′ generally includes a similar configuration of layers as the material 100 of FIG. 1A, except that the positions of the OPE and ink layer(s) 102*a*, 104 are reversed/interchanged. Additionally, in this example, the ink layer(s) 104' may be curable ink (e.g., an energy-curable ink, such as an electron beam curable ink or ultraviolet light curable ink). By configuring the material in this manner, the various layers 102*a*, 106, 112, 102*b*, 114, and any associated skin layers may be pre-assembled and joined to one another, and the assembled layers may then later be printed on demand as needed. This may provide improved speed of service to customers needing a variety of different printed materials and/or customers needing printed materials quickly.

In the material 100" of FIG. 1C, layers 106, 102*b*, and 112 of FIG. 1A are omitted, and the positions of the OPE and ink layer(s) 102, 104 are reversed/interchanged. As with FIG. 1B, the ink layer(s) 104' may be curable ink (e.g., an energy-curable ink, such as an electron beam curable ink or ultraviolet light curable ink). In this example, the OPE film layer 102 may have a thickness of from about 60 to about 200 gauge, for example, from about 120 to about 180 gauge, for example, about 160 gauge.

Figure 2A:
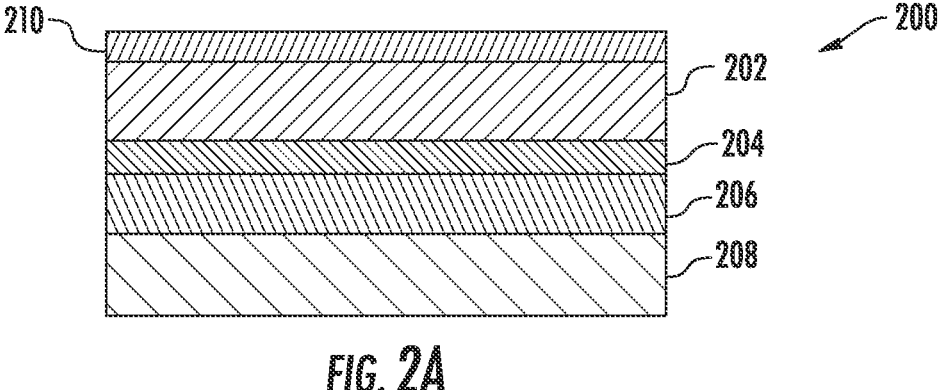
FIG. 2A is like FIG. 1A, except that predetermined layers have been omitted, in accordance with an embodiment of this disclosure.

FIG. 2A schematically depicts another exemplary recyclable material/composite material/structure 200. The material 200 may be suitable for use as a packaging material, for example, for food items.

The material 200 may generally include a plurality of layers in a superposed, facing, contacting relationship with one another. The layers may be continuous or discontinuous, as will be understood in the art, and as will be described further below.

More particularly, in the example depicted FIG. 2A, the material 200 may include a layer of oriented polyethylene (OPE) 202 (e.g., such as MDOPE, BOPE, MDHDPE, or BOHDPE), printed ink layer(s) 204 (optional, but may typically be present when the material is used to form a package), a tie layer 206, a sealant film layer 208, and any associated skin layers. The structure may also include an optional overcoat or overprint layer 210.

The OPE layer 202 may have a thickness of from about 60 to about 100 gauge, for example, from about 80 to about 110 gauge, for example, about 100 gauge.

The sealant film layer 208 may generally comprise polyethylene, for example, linear low density polyethylene (LLDPE) or coextruded ethylene vinyl alcohol (EVOH)/polyethylene. The sealant film 208 may have any suitable thickness, for example, from about 100 to about 600 gauge (about 1 to about 6 mil), depending on the type of package being made. For example, if the material 200 is used to make a pillow pouch, the sealant film 208 may have a thickness of from about 100 to about 300 gauge, for example, about 175 gauge. If the material 200 is used to make a stand-up pouch, the sealant film may have a thickness of from about 300 to about 600 gauge, for example, about 350 gauge.

In one variation, the tie layer 206 may comprise an adhesive layer (i.e., adhesive/adhesive lamination). Any suitable adhesive may be used, for example, an acrylic polyurethane adhesive. The adhesive may be applied in an amount of from about 1 to about 1.5 lb/ream, for example, about 1.25 lb/ream.

In another variation, the tie layer 206 may comprise an extruded layer (i.e., extrudate/extrusion lamination). Any suitable extrudate may be used, for example, polyethylene, LDPE, or LLDPE. The extrudate layer may have a basis weight of from about 4 to about 14 lb/ream, for example, about 8 lb/ream.

Where used, the optional overcoat or overprint layer 210 may be, for example, a matte overprint varnish, a soft-touch overprint varnish, and/or another suitable overcoat or overprint. The overcoat or overprint layer 210 may be applied as a flood coat or in discrete areas, and may have a coat weight of from about 0.1 to about 2 lb/ream.

Figure 2B:
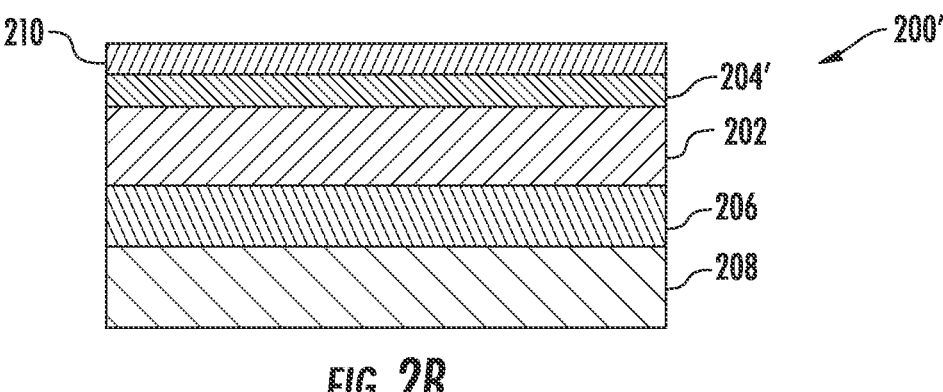
FIG. 2B is like FIG. 1B, except that predetermined layers have been omitted, in accordance with an embodiment of this disclosure.

FIG. 2B schematically depicts an exemplary variation of the material 200 of FIG. 2A. In FIG. 2B, the material 200' generally includes a similar configuration of layers to those of the material 200 of FIG. 2A, except that the positions of the OPE and ink layer(s) 202, 204 are reversed/interchanged. Additionally, in this example, the ink layer(s) 204' may be a curable ink (e.g., an energy-curable ink, such as an electron beam curable ink or ultraviolet light curable ink).

Figure 3A:
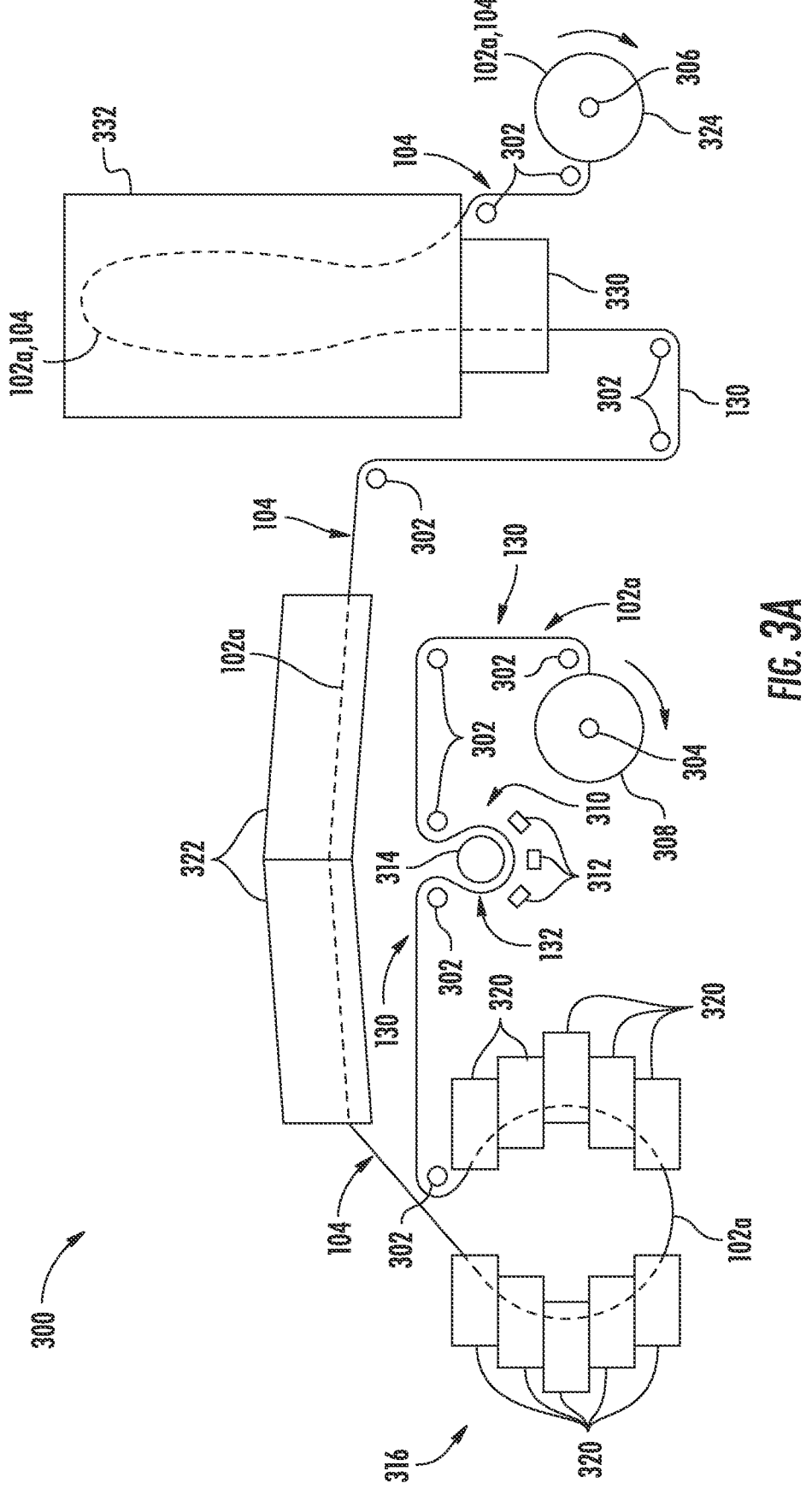
FIG. 3A is a side view that depicts initial aspects of a method of forming the printed web of FIG. 1A in an applicator system, in accordance with an embodiment of this disclosure.
Figure 3B:
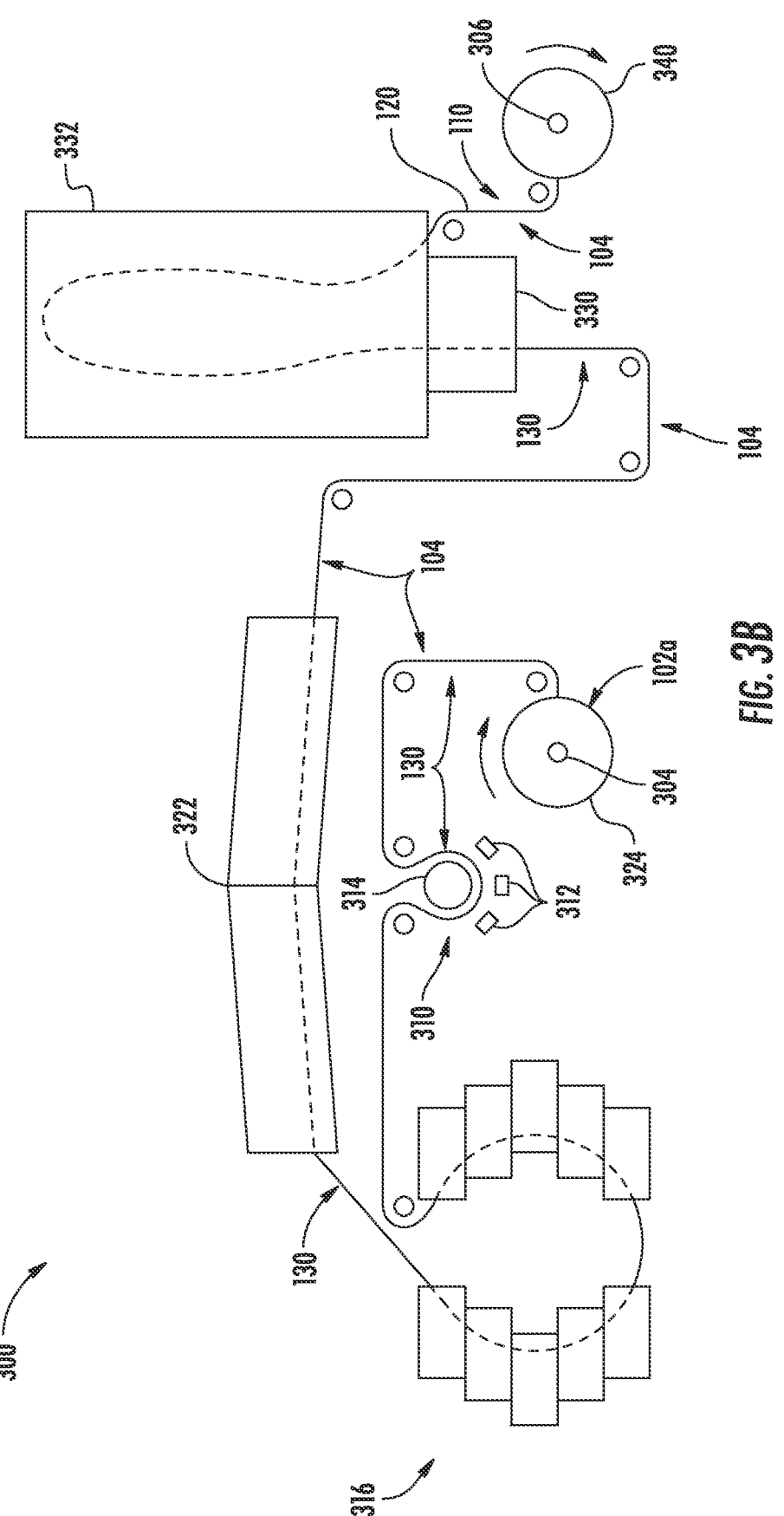
FIG. 3B is a side view that depicts further aspects of the example of the method of forming the printed web of FIG. 1A in the applicator system, in accordance with an embodiment of this disclosure.

FIGS. 3A and 3B are side views that depict aspects of an example of a method of repeatedly drawing at least the first OPE layer 102*a* through an applicator system 300 to at least partially form, for example, the first composite web 120 (e.g., printed web) of the packaging material 100 of FIG. 1A. The applicator system 300 is depicted as an "inline system" configured so that numerous features are incorporated together in the single system 300. Alternatively, one or more of the processes or operations that are described herein as being performed within the applicator system 300 can be performed "out of line" by separate system(s).

The depicted example of the applicator system 300 includes a series of rollers 302 and/or other suitable conveyance devices positioned between a feed-out spindle 304 and a take-up spindle 306, wherein the rollers and/or other features define a path of travel along which the first OPE layer 102*a* (e.g., a web comprising the first OPE layer 102*a*) is drawn. Those of ordinary skill in the art will understand that FIGS. 3A and 3B are schematic because, for example, only a representative few of the rollers 302 and other features of the applicator system 300 are schematically depicted (e.g., the web travel path may be curvier than depicted in FIGS. 3A and 3B).

Referring to FIG. 3A, the first OPE layer 102*a* may be drawn from a supply roll 308 supported by the feed-out spindle 304. The first OPE layer 102*a* may be drawn along the web travel path from the supply roll 308 to and through a surface treatment station 310 for improving subsequent adhesion. The first OPE layer's second surface 132 may have been previously treated to increase its surface energy (e.g., corona treated and/or otherwise suitably treated) during original manufacture of (e.g., downstream from extrusion of) the first OPE layer 102*a* by a supplier of the first OPE layer. The first OPE layer's second surface 132 may be initially or further treated to increase its surface energy (e.g., corona treated, "bump treated," and/or otherwise suitably treated) while the first OPE layer 102*a* is drawn through the surface treatment station 310.

The surface treatment station 310 may include a corona treater, plasma treater, and/or other suitable surface treater for increasing surface energy, wherein a series of the surface treaters 312 (e.g., corona treaters) may be spaced apart along the length of the web travel path. In the depicted example, the surface treaters 312 extend partially around an electrically grounded roller 314 of the surface treatment station 310. The surface treaters 312 typically include electrodes (e.g., corona-producing electrodes) that are configured to be spaced apart from, and in opposing face-to-face relation with, the electrically grounded roller 314. Suitable electrical power is typically supplied to the electrodes from suitable power generator(s). The first OPE layer 102*a* is typically drawn through the gap between the surface treaters 312 and the electrically grounded roller 314 so that the first OPE layer's second surface 132 is in opposing face-to-face relation with the surface treaters 312, and the first OPE layer's first surface 130 is engaged against the electrically grounded roller 314.

At least partially reiterating from above, as an alternative to the first OPE layer's second surface 132 being initially or further treated at the treatment station 310, the first OPE layer 102*a* may be part of a coextrusion that further includes a skin layer that is joined to the first OPE layer's second surface 132 and has a relatively high surface energy, or the like. As another example, the outer surface of this skin layer may be treated at the treatment station 310.

The first OPE layer 102*a* (e.g., web 102*a*) may be drawn along the web travel path from the surface treatment station 310 to and through a first application station that may more specifically be a print station 316. One or more printed ink layers 104 may be applied to the first OPE layer's second surface 132 in the print station 316.

In the example depicted in FIG. 3A, the print station 316 includes a series of printing devices 320 (e.g., flexographic printing presses) that are spaced apart along the length of the web travel path. More generally, there may be one or more of such printing devices 320. As compared to one another, each of the printing devices 320 can be configured to print/apply a different color ink onto the first OPE layer's second surface 132. The one or more printing devices 320 can each be a flexographic press, rotogravure press, inkjet printer, and/or any other suitable device for applying the ink layer(s) 104, wherein the ink of the ink layer(s) 104 is typically applied in a predetermined manner (e.g., reverse printed to provide text and/or graphics), as will be described further below.

The first OPE layer 102*a* supporting the ink layer(s) 104 (e.g., web 102*a*, 104) may be drawn along the web travel path from the print station 316 to and through one or more dryers, drying ovens 322, and/or other suitable devices for drying and/or curing the printed ink layer(s) 104. From the drying ovens 322, the first OPE layer 102*a* supporting the ink layer(s) 104 may be drawn along the web travel path to a take-up roll 324 supported by the take-up spindle 306, so that the first OPE layer 102*a* supporting the ink layer(s) 104 is wound onto the take-up roll 324.

With continued reference to FIG. 3A, and in accordance with the example of the method for forming the first composite web 120 of the packaging material 100 of FIG. 1A, the first OPE layer 102*a* supporting the ink layer(s) 104 may optionally reach the take-up roll 324 by way of inactive components of the applicator system 300 that are positioned along the web travel path. In the example depicted in FIG. 3A, the inactive components of the applicator system 300 that are positioned along the web travel path may include a second application station, which may more specifically be a coat station 330, and one or more dryers, drying ovens 322, and/or other suitable devices for drying and/or curing any coating(s) applied by the at least one coat station 330, as will be described further below.

Further regarding the example of the method for forming the first composite web 120 of the packaging material 100 of FIG. 1A, the completed roll 324 of the first OPE layer 102*a* supporting the ink layer(s) 104 formed in FIG. 3A may be moved to the feed-out spindle 304 of the applicator system 300, as depicted in FIG. 3B. In the example depicted in FIG. 3B, the first OPE layer 102*a* is supplied into the system 300 in an inverted configuration as compared to FIG. 3A, as will be described further below.

Referring to FIG. 3B, the first OPE layer 102*a* supporting the ink layer(s) 104 may be drawn from the roll 324 supported by the feed-out spindle 304. The first OPE layer

102*a* supporting the ink layer(s) 104 may be drawn along the web travel path from the roll 324 to and through the surface treatment station 310 for improving subsequent adhesion. The first OPE layer's first surface 130 may be corona treated (e.g., "bump treated") while the first OPE layer 102*a* supporting the ink layer(s) 104 is drawn through the surface treatment station 310. The first OPE layer 102*a* supporting the ink layer(s) 104 is typically drawn through the gap between the surface treaters 312 and the electrically grounded roller 314 so that the first OPE layer's first surface 130 is in opposing face-to-face relation with the surface treaters 312, and the ink layer(s) 104 are engaged against the electrically grounded roller 314.

At least partially reiterating from above, as an alternative to the first OPE layer's first surface 130 being initially or further treated at the treatment station 310, the first OPE layer 102*a* may be part of a coextrusion that further includes a skin layer that is joined to the first OPE layer's first surface 130 and has a relatively high surface energy, or the like. As another example, the outer surface of this skin layer may be treated at the treatment station 310.

From the surface treatment station 310, the first OPE layer 102*a* supporting the ink layer(s) 104 may be drawn along the web travel path to the coat station 330. With continued reference to FIG. 3B, and in accordance with the example of the method for forming the first composite web 120 of the packaging material 100 of FIG. 1A, the first OPE layer 102*a* supporting the ink layer(s) 104 may optionally reach the coat station 330 by way of inactive components of the applicator system 300 that are positioned along the web travel path. In the example depicted in FIG. 3B, these inactive components of the applicator system 300 that are positioned along the web travel path may include the print station 316 and drying ovens 322.

With continued reference to FIG. 3B, and in accordance with the example of the method for forming the first composite web 120 of the packaging material 100 of FIG. 1A, the cold seal release coating 110 is applied to the first OPE layer's first surface 130 in the coat station 330. The coat station 330 typically includes or comprises at least one applicator or coating device configured to apply at least one layer or coating of cold seal release material 110 (e.g., cold seal release lacquer) to the first OPE layer's first surface 130. The at least one applicator or coating device of the coat station 330 is typically configured to provide the cold seal release material 110 in a flood coat, although different configurations (e.g., patterns) of one or more cold seal release coatings are within the scope of this disclosure. The at least one coating device of the coat station 330 may be a gravure coating device, offset gravure coating device, reverse roll coater, and/or any other suitable device for applying the at least one layer of cold seal release material.

The first OPE layer 102*a* supporting the ink layer(s) 104 and cold seal release coating 110 may be drawn along the web travel path from the coat station 330 to and through the one or more dryers, drying ovens 332, and/or other suitable devices for drying and/or curing the cold seal release coating 110 and, thus, complete formation of the first composite web 120. From the drying ovens 332, the first composite web 120 may be drawn along the web travel path to a take-up roll 340 supported by the take-up spindle 306, so that the first composite web 120 is wound onto the take-up roll 340.

In the above-described example of repeatedly drawing at least the first OPE layer 102*a* through the applicator system 300 to at least partially form the first composite web 120 (e.g., printed web) of the packaging material 100 of FIG. 1A, at the same point along the web travel paths of FIGS. 3A and 3B, the orientations of the first OPE layer 102*a* are inverted from one another. More specifically, as depicted in FIG. 3A, the first OPE layer 102*a* is drawn through the system 300 so that the first OPE layer's second side 132 is in opposing face-to-face relation with a predetermined component (e.g., a surface treater 312 or other suitable component) of the system 300, including providing the first OPE layer 102*a* in a first orientation to the system 300; and as depicted in FIG. 3B, the first OPE layer 102*a* is drawn through the system 300 so that the first OPE layer's first side or surface 130 is in opposing face-to-face relation with a predetermined component (e.g., a surface treater 312 or other suitable component) of the system 300, including providing the first OPE layer 102*a* in a second orientation to the system 300. In one aspect of this disclosure, these first and second orientations of the first OPE layer 102*a* are inverted from one another.

As an example of the numerous variations that are within the scope of this disclosure, the method described with reference to FIG. 3B may occur before the method described with reference to FIG. 3A, and/or the system 300 may be modified so that the methods described with reference to FIGS. 3A and 3B occur in a single pass through the modified system. As another example, it is believed that the composite web or layer depicted in FIG. 1B as consisting of or consisting essentially of the OPE layer 102*a*, ink layer(s) 104', and cold seal release coating 110 may be formed during a single pass through the system 300.

Figure 3C:
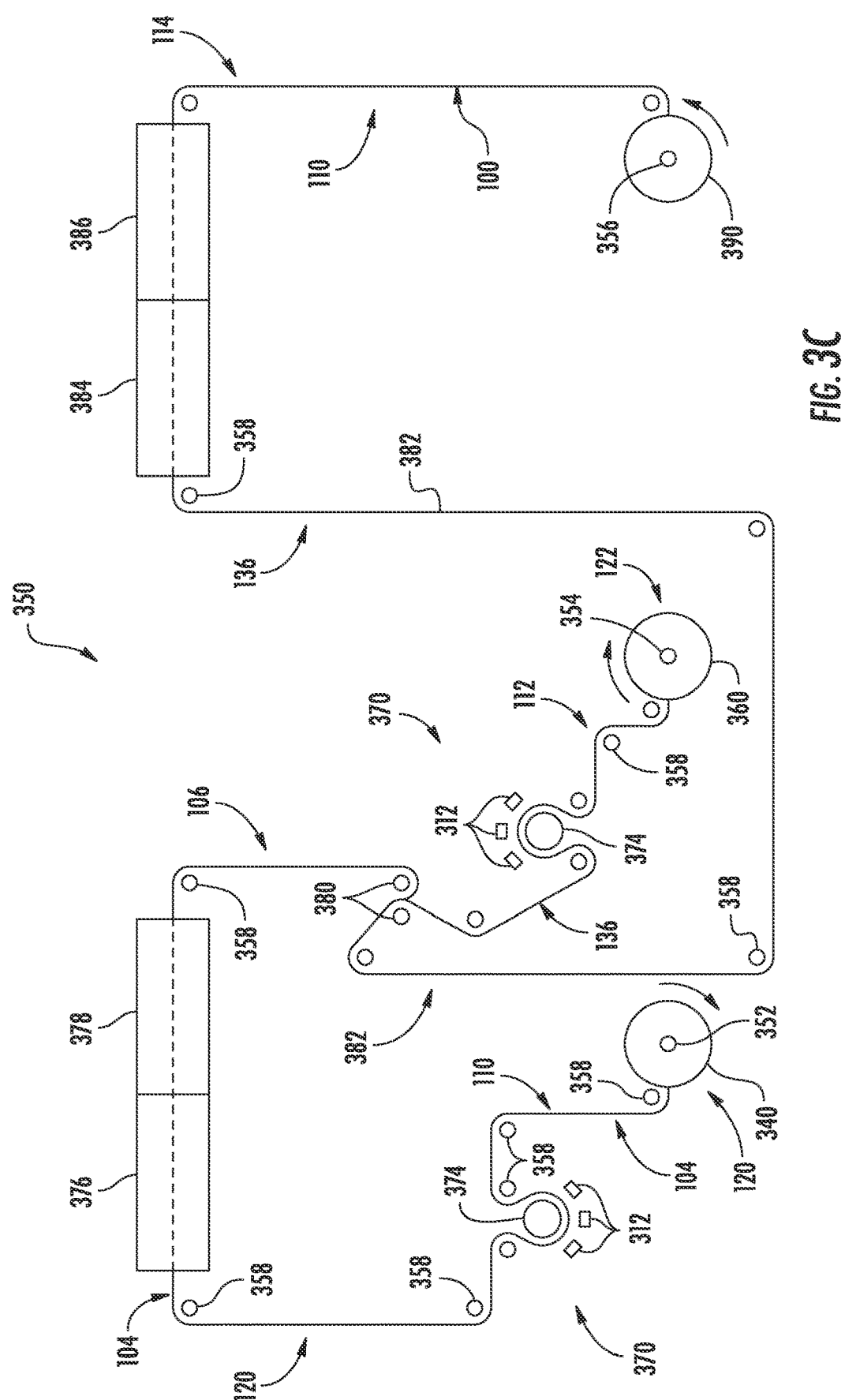
FIG. 3C is a side view that depicts aspects of an example of a method of forming the packaging material of FIG. 1A, which includes laminating together the printed and barrier webs, in accordance with an embodiment of this disclosure.

Further regarding the example of the method for forming the packaging material 100 of FIG. 1A, the roll 340 of the first composite web 120 formed in FIG. 3B may be moved as depicted in FIG. 3C to a first feed-out spindle 352 of a lamination system 350. FIG. 3C is a side view depicting aspects of an example of a method of forming the packaging material 100 of FIG. 1A.

In FIG. 3C, the lamination system 350 is depicted as an "inline system" configured so that numerous features are incorporated together in the single system 350. Alternatively, one or more of the processes or operations that are described herein as being performed within the lamination system 350 can be performed "out of line" by separate system(s).

The depicted example of the lamination system 350 includes a series of rollers 358 and/or other suitable conveyance devices positioned between first and second feed-out spindles 352, 354 and a take-up spindle 356, wherein the rollers and/or other features define paths of travel along which webs (e.g., the packaging material 100 and composite layers or webs 120, 122) are respectively drawn. Those of ordinary skill in the art will understand that FIG. 3C is schematic because, for example, only a representative few of the rollers 350 and other features of the lamination system 350 are schematically depicted (e.g., the web travel paths are typically curvier than depicted in the drawings).

With continued reference to FIG. 3C, a roll 360 of the second composite web 122 (e.g., barrier web) may be placed upon the second first feed-out spindle 352. Prior to being formed into the roll 360, the second composite web 122 may be formed by depositing the barrier layer 112 (FIG. 1A) on the first surface 134 (FIG. 1A) of the second OPE layer 102*b* (FIG. 1A).

Prior to depositing the barrier layer 112 (FIG. 1A) on the second OPE layer's first surface 134 (FIG. 1A), the second OPE layer's first surface 134 may be treated to increase its surface energy (e.g., using a corona treater, plasma treater, and/or other suitable surface treater). This surface treating may have occurred during original manufacture of (e.g., downstream from extrusion of) the second OPE layer 102*b* by a supplier of the second OPE layer and/or thereafter. Alternatively, and at least partially reiterating from above, the second OPE layer 102*b* can be the core layer of a coextruded film that further includes one or more skin layers that are typically thinner than the core layer, and the barrier layer 112 may be deposited on such a skin layer.

In the lamination system 350 depicted in FIG. 3C, the first and second composite layers or webs 120, 122 (also see, e.g., FIG. 1A) may be drawn from their respective rolls 340, 360 along respective web travel paths to and through respective surface treatment stations 370. The surface treatment stations 370 may include a corona treater, plasma treater, and/or other suitable surface treater for increasing surface energy, wherein a series of the surface treaters 312 (e.g., corona treaters) may be spaced apart along the length of the respective web travel path. In each of the surface treatment stations 370, the surface treaters 312 typically extend partially around an electrically grounded roller 374 of the surface treatment station. The surface treaters 372 typically include electrodes (e.g., corona-producing electrodes) that are configured to be spaced apart from and in opposing face-to-face relation with the respective electrically grounded roller 374, and suitable electrical power is typically supplied to the electrodes from suitable power generator(s).

In the example depicted in FIG. 3C, the first composite web 120 (e.g., printed web) is drawn through the gap between the associated surface treaters 372 and electrically grounded roller 374 so that the first composite web's printed ink layer(s) 104 is in opposing face-to-face relation with the surface treaters 372, and the first composite web's cold seal release coating 110 is engaged against the electrically grounded roller 314; and the second composite web 122 (e.g., barrier web) is drawn through the gap between the associated surface treaters 372 and electrically grounded roller 374 370 so that the second composite web's barrier layer 112 is in opposing face-to-face relation with the surface treaters 372, and the second OPE layer's second surface 136 is engaged against the electrically grounded roller 314. The first composite web's printed ink layer(s) 104 may be initially or further treated to increase its surface energy (e.g., corona treated, "bump treated," and/or otherwise suitably treated) while the first composite web 120 is drawn through the respective surface treatment station 370. Similarly, the second composite web's barrier layer 112 may be initially or further treated to increase its surface energy (e.g., corona treated, "bump treated," and/or otherwise suitably treated) while the second composite web 122 is drawn through the respective surface treatment station 370.

In the example depicted in FIG. 3C, the first composite web 120 (e.g., printed web) is drawn along the respective upstream web travel path from the respective surface treatment station 370 to and through a first application station that may more specifically be a coat station 376. With continued reference to FIG. 3C and in accordance with an example of the method for forming the packaging material 100 of FIG. 1A, the adhesive that forms the tie layer 106 (FIG. 1A) is applied to the first composite web's printed ink layer(s) 104 in the first coat station 376. The first coat station 376 typically includes or comprises at least one applicator or coating device configured to apply at least one layer or coating of the adhesive that forms the tie layer 106 in a flood coat, although different configurations (e.g., patterns) of one or more adhesives for forming the tie layer 106 are within the scope of this disclosure. For example, the adhesive that forms the tie layer 106 may be initially applied to the second composite web's barrier layer 112, the tie layer 106 may be an extrudate as discussed above, and/or the tie layer may be formed in any other suitable manner. The at least one coating device of the first coat station 376 may be a gravure coating device, offset gravure coating device, reverse roll coater, and/or any other suitable device for applying the at least one layer of adhesive material. When the tie layer 106 is formed from adhesive provided by the first coat station 376, the adhesive-coated first composite web 120 (e.g., printed web) may be drawn along the respective upstream web travel path from the first coat station 376 to and through the one or more dryers, drying ovens 378, and/or other suitable devices for at least partially drying and/or curing (e.g., for at least partially removing any solvent and/or otherwise activating the adhesive).

In the example depicted in FIG. 3C, the adhesive-coated first composite web 120 (e.g., printed web) is drawn along the respective upstream web travel path from the drying oven 378 to a nip defined between nip rollers 380, and the second composite web 122 (e.g., barrier web) is drawn along the respective upstream web travel path from the respective surface treatment station 370 to the nip defined between the nip rollers. The upstream web travel paths converge at the nip rollers 380 so that the tie layer 106 connects the printed ink 104 of the first composite web 120 to the barrier layer 112 of the second composite web 122. More generally and at least partially reiterating from above, the first composite web 120 (e.g., printed web) and second composite web 122 (e.g., barrier web) may be joined together by adhesive lamination, extrusion lamination, and/or in any other suitable manner to form a precursor web 382 that is a precursor to the packaging material 100.

In the example depicted in FIG. 3C, the precursor web 382 is drawn along a downstream web travel path from the nip rollers 380 to and through a second application station that may more specifically be a coat station 384. With continued reference to FIG. 3C and in accordance with an example of the method for forming the packaging material 100 of FIG. 1A, the adhesive that forms the cold seal adhesive layer 114 (FIG. 1A) is applied in the second coat station 384 to the precursor web 382. More specifically, the cold seal adhesive 114 is applied in the second coat station 384 to the second surface 136 of the second OPE layer 102*b*. The second coat station 384 typically includes or comprises at least one applicator or coating device configured to apply at least one layer or coating of the adhesive that forms the cold seal adhesive 114 in a pattern, as will be described further below. The at least one coating device of the second coat station 384 may be a gravure coating device, offset gravure coating device, reverse roll coater, and/or any other suitable device for applying the at least one layer of the cold seal adhesive 114. When cold seal adhesive 114 adhesive is provided by the second coat station 384, the resulting packaging material 100 may be drawn along the downstream web travel path from the second coat station 384 to and through the one or more dryers, drying ovens 386, and/or other suitable devices for at least partially drying and/or curing (e.g., for at least partially removing any solvent of the adhesive). More generally and at least partially reiterating from above, the patterned cold seal adhesive 114 may be replaced with a heat seal layer (e.g., a patterned heat seal layer).

From the one or more drying ovens 386, the first web of packaging material 100 may be drawn along the downstream web travel path to a take-up roll 390 supported by the take-up spindle 356, so that packaging material is wound onto the take-up roll 340. For example, the packaging material 100 is typically wound onto the take-up roll 340 so that the cold seal adhesive 114 is in opposing face-to-face contact with, and releasably adhered to, the cold seal release layer 110.

Respective components of the systems 300, 350 depicted in FIGS. 3B-3C can be controlled in a predetermined manner by one or more computerized controllers. For example, the controllers can communicate with respective components of the systems 300, 350 by way of respective communication paths (e.g., wired electrical communication paths and/or wireless (e.g., radio wave) communication paths). In addition to communications between the controllers and respective components depicted in FIGS. 3B-3C, the controllers can communicate with any other suitable components that may be present in the systems 300, 350, for example motor controller(s), optical sensor(s) for sensing eye marks, and/or any other suitable features. The computerized controllers can include, or otherwise be associated with, one or more computer processors, computer software and/or computer memory devices cooperatively configured for causing the systems 300, 350 (e.g., features thereof) to operate in a predetermined manner to at least partially manufacture the packaging materials of this disclosure.

Figure 4A:
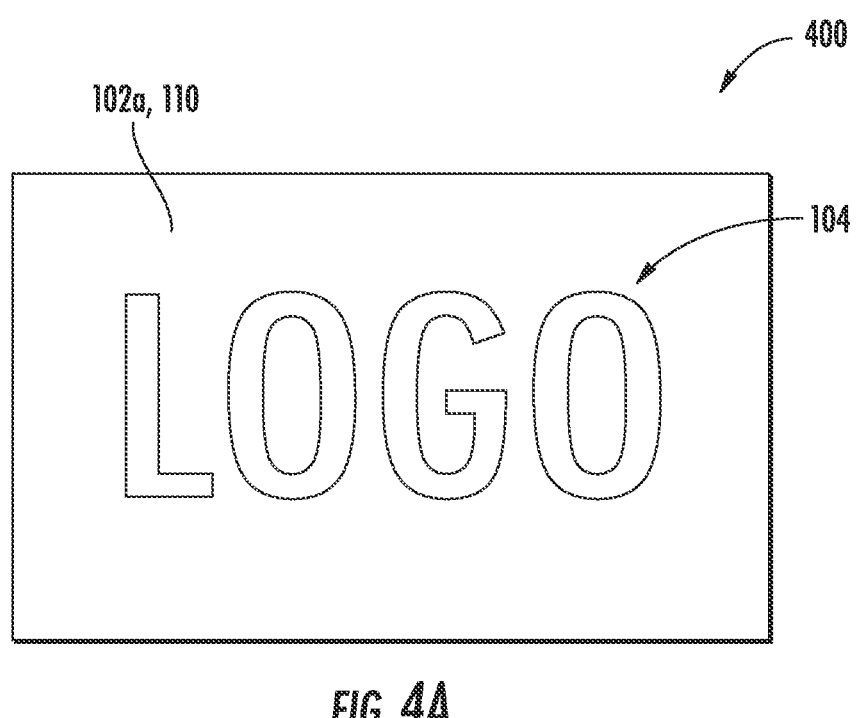
FIG. 4A is a plan view of an outer side of a wrapper portion that is representative of wrapper portions cut from the packaging material of FIG. 1A, wherein the wrapper portion is in an open, flat configuration, in accordance with an embodiment of this disclosure.
Figure 4B:
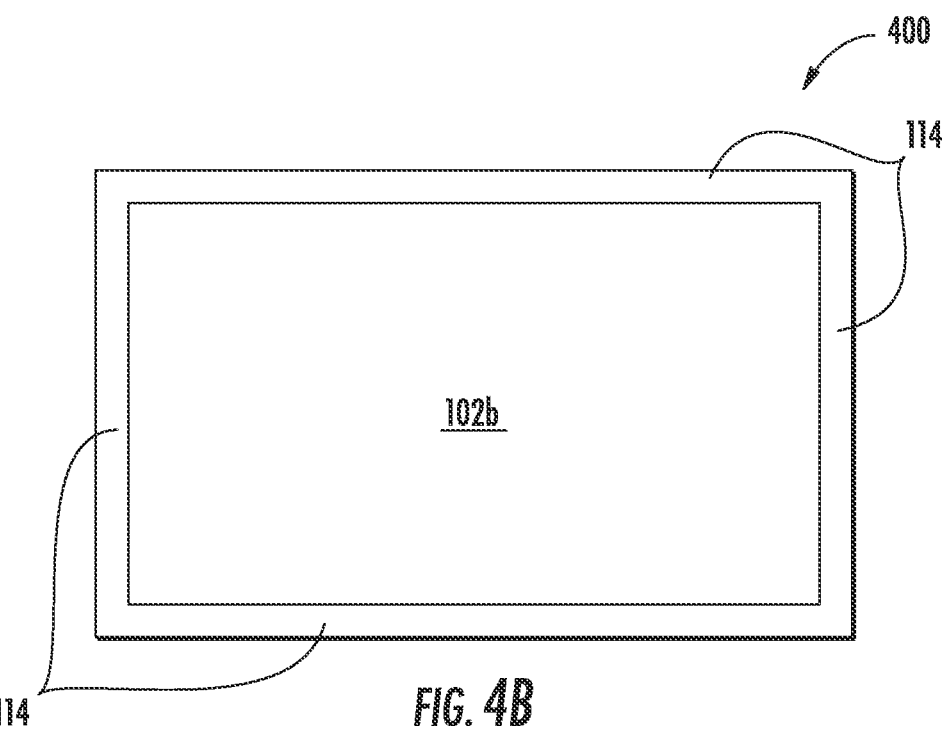
FIG. 4B is a plan view of an interior side of the wrapper of FIG. 4A, in accordance with an embodiment of this disclosure.

As one of numerous examples of a method of forming packages from the packaging material 100, the packaging material can be cut into lengthwise strips that extend in the machine direction. Each of such strips of the packaging material 100 can be unwound from a roll and supplied to a conventional form-fill-seal machine (e.g., flow wrapping machine) that converts the strip into bags, overwraps, or the like. As examples, FIGS. 4A and 4B schematically depict opposite sides of a single wrapper portion 400 of the packaging material 100, wherein the wrapper 400 is in an open, flat configuration in FIGS. 4A and 4B. More specifically, FIG. 4A depicts the exterior side of the wrapper 400, and FIG. 4B depicts the interior side of the wrapper 400, in accordance with an embodiment of this disclosure. In the example depicted in FIG. 4A, the printed ink(s) 104 may at least partially define indicium, indicia, graphics, logos, and/or any other suitable artwork that is included in the packaging material 100, such as a series of indicia in the form of a "LOGO" or in any other suitable configuration. As depicted in FIG. 4A, typically the indicium, indicia, graphics, logos, or the like, defined by the respective portions of the ink(s) 104 are (e.g., the reverse-printed "LOGO" is) visible through the transparent and/or translucent first or outer OPE layer 102*a* (also see, e.g., FIG. 1A) and the transparent and/or translucent cold seal release layer 110 (also see, e.g., FIG. 1A).

Figure 4C:
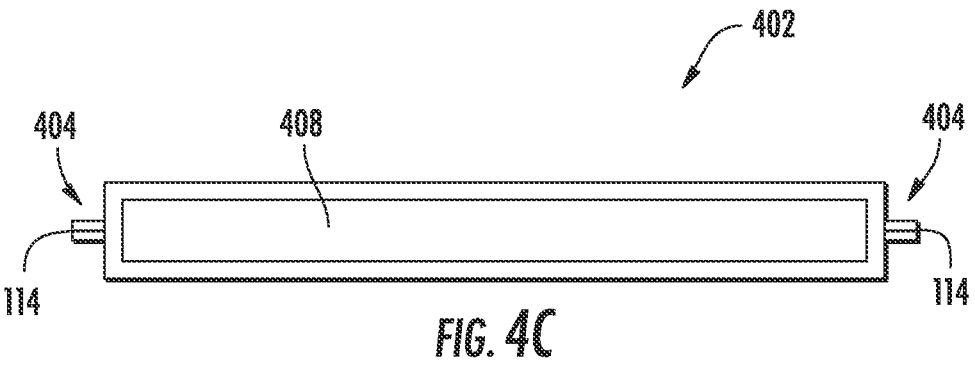
FIG. 4C is a cross-sectional view of a package formed from the wrapper of FIGS. 4A and 4B, in accordance with an embodiment of this disclosure.
Figure 4D:
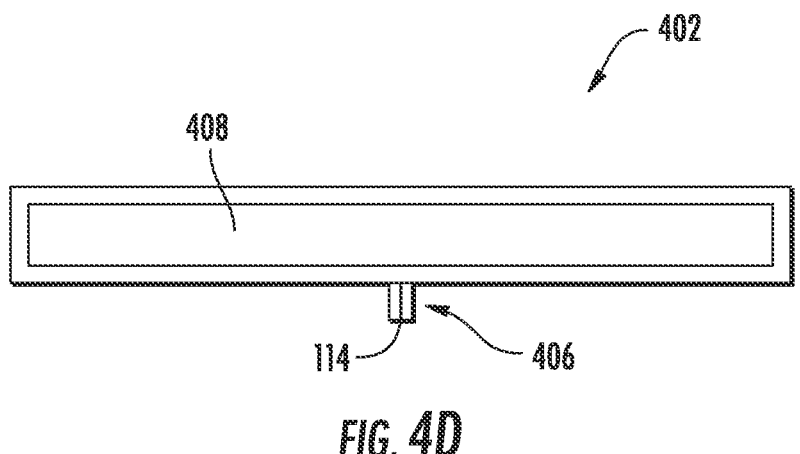
FIG. 4D is another cross-sectional view of the package of FIG. 4C, in accordance with an embodiment of this disclosure.

Referring to FIG. 4B, the cold seal adhesive 114 can cover the margins of the interior side of the wrapper 400, so that the wrapper can be folded over onto itself to form a package 402 (FIGS. 4C and 4D). Referring to FIGS. 4C and 4D, the respective strips of the cold seal adhesive 114 can be in opposing face-to-face contact with one another, and cohered to one another, to at least partially form end seals 404 and a fin seal 406 of the package 402. The fin seal 406 typically extends from one to the other of the end seals 404. Each package 402 can contain one or more conventional articles 408, for example food products or any other suitable articles. Each package 402 can completely enclose its contents/articles 408 in a hermitically sealed manner. A wide variety of differently configured packaging materials, wrappers, packages, seals and articles are within the scope of this disclosure.

Reiterating from above, it is within the scope of this disclosure for one or more of the terms "substantially," "about," "approximately," and/or the like, to qualify each of the adjectives and adverbs of the foregoing disclosure, for the purpose of providing a broad disclosure. As an example, it is believed that those of ordinary skill in the art will readily understand that, in different implementations of the features of this disclosure, reasonably different engineering toler- ances, precision, and/or accuracy may be applicable and suitable for obtaining the desired result. Accordingly, it is believed that those of ordinary skill will readily understand usage herein of the terms such as "substantially," "about," "approximately," and the like.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, varia- tions, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification pur- poses to aid the reader's understanding of the various embodiments of the present invention, and do not create limitations, particularly as to the position, orientation, or use of the invention unless specifically set forth in the claims. Joinder references (e.g., joined, attached, coupled, con- nected, and the like) are to be construed broadly and may include intermediate members between a connection of elements and relative movement between elements. As such, joinder references do not necessarily imply that two ele- ments are connected directly and in fixed relation to each other. Further, various elements discussed with reference to the various embodiments may be interchanged to create entirely new embodiments coming within the scope of the present invention.

In the specification and drawings, examples of embodi- ments have been disclosed. The present invention is not limited to such exemplary embodiments. The use of the term "and/or" includes any and all combinations of one or more of the associated listed items. Unless otherwise noted, specific terms have been used in a generic and descriptive sense and not for purposes of limitation.

What is claimed is:

1. A method of at least partially forming a recyclable packaging material, the method comprising:

printing an ink layer onto at least a portion of at least one of an inner surface of a first layer comprising oriented polyethylene or an outer surface of the first layer comprising oriented polyethylene;

drawing the first layer through a system so that the inner surface of the first layer is in opposing face-to-face relation with a predetermined component of the system, including providing the first layer in a first orientation to the system, wherein the printing occurs during the drawing;

drawing the first layer through the system with the outer surface of the first layer in opposing face-to-face rela- tion with the predetermined component, including pro- viding the first layer in a second orientation to the system, and the first and second orientations being inverted from one another;

during the providing of the first layer in the second orientation to the system, applying material onto at least a portion of at least one of the ink layer or the outer surface of the first layer;

laminating the first layer to a second layer comprising oriented polyethylene;

applying a patterned adhesive layer on at least a portion of an outer surface of the second layer, so that the patterned adhesive layer partially defines an exterior surface of the recyclable packaging material; and then forming the recyclable packaging material into a roll, wherein in the roll of the recyclable packaging material the patterned adhesive layer is in opposing face-to-face contact with the material.

2. The method of claim 1, wherein:

the patterned adhesive layer is a patterned cold seal adhesive layer;

the exterior surface of the recyclable packaging material is a first exterior surface of the recyclable packaging material;

the applying of the material onto at least a portion of at least one of the ink layer or the outer surface of the first layer is comprised of applying a cold seal release layer on at least a portion of at least one of the ink layer or the outer surface of the first layer, so that the cold seal release layer at least partially defines a second exterior surface of the recyclable packaging material that is opposite from the first exterior surface of the recyclable packaging material; and in the roll of the recyclable packaging material the pat- terned cold seal adhesive layer is in opposing face-to- face contact with the cold seal release layer.

3. The method of claim 2, wherein at least one of the first and second layers comprises a metallic barrier layer.

4. The method of claim 1, wherein:

the patterned adhesive layer is a patterned cold seal adhesive layer;

the material is a cold seal release material; and in the roll of the recyclable packaging material the pat- terned cold seal adhesive layer is in opposing face-to- face contact with the cold seal release material.

5. The method of claim 4, wherein at least one of the first and second layers comprises a metallic barrier layer.

6. The method of claim 1, wherein the laminating of the first layer to the second layer is comprised of:

extruding polymeric material onto at least one of the first and second layers; and nipping together the first and second layers while the extruded polymeric material is positioned between the first and second layers.

7. The method of claim 6, wherein the extruded polymer comprises at least one of polyethylene, low density poly- ethylene, and linear low density polyethylene.

8. The method of claim 1, wherein the laminating of the first layer to the second layer is comprised of:

applying adhesive onto at least one of the first and second layers; and nipping together the first and second layers while the adhesive is positioned between the first and second layers.

9. The method of claim 8, wherein the adhesive comprises an acrylic polyurethane adhesive.

10. The method of claim 9, wherein:

the oriented polyethylene of the first layer is oriented high density polyethylene; and the oriented polyethylene of the second layer is oriented high density polyethylene.

11. The method of claim 1, wherein at least one of the oriented polyethylene of the first layer and the oriented polyethylene of the second layer is oriented high density polyethylene.

12. The method of claim 1, comprising a metallic barrier layer on at least a portion of at least one of the first and second layers.

13. The method of claim 12, wherein the metallic barrier layer comprises at least one of aluminum and aluminum oxide deposited on the second layer.

14. The method of claim 1, wherein the patterned adhesive layer comprises a heat seal adhesive.

15. The method of claim 14, wherein the heat seal adhesive layer comprises at least one of polyethylene, low density polyethylene, and linear low density polyethylene.

16. The method of claim 15, wherein:

the oriented polyethylene of the first layer is oriented high density polyethylene; and the oriented polyethylene of the second layer is oriented high density polyethylene.

17. The method of claim 1, further comprising:

drawing the recyclable packaging material from the roll; and forming the recyclable packaging material into a package in which the patterned adhesive layer at least partially defines a seal of the package.

18. The method of claim 1, wherein:

the ink layer is printed onto at least a portion of the inner surface of the first layer; and the material is applied onto at least a portion of the outer surface of the first layer.

19. The method of claim 18, wherein the predetermined component comprises a surface treater.

20. The method of claim 18, wherein the material comprises cold seal release material.

* * * * *